(No Model.)
C. HEDGES.
STAKE SHOE.
No. 492,520. Patented Feb. 28, 1893.
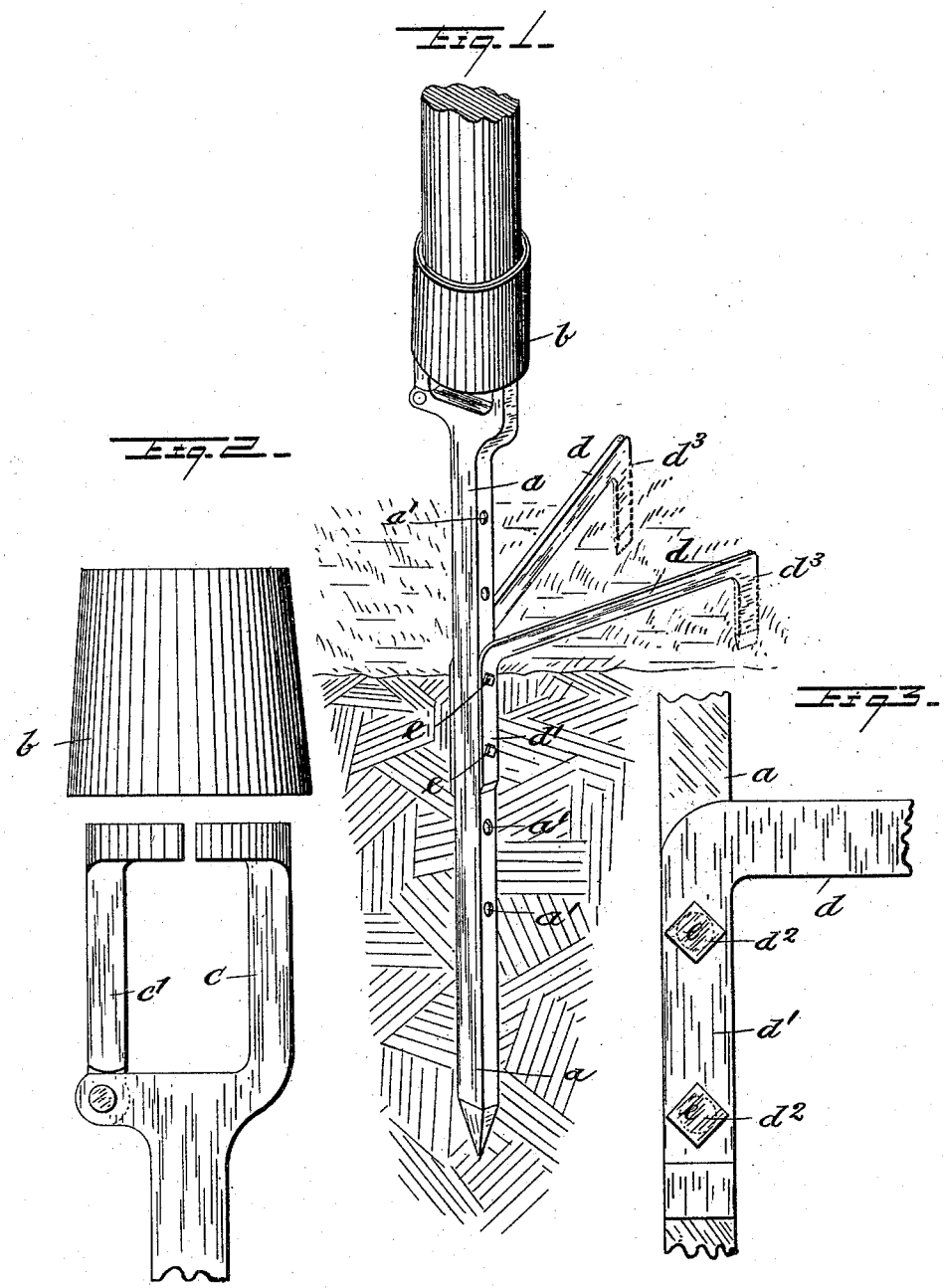
Witnesses
Inventor
Charles Hedges
by his Attorney

UNITED STATES PATENT OFFICE.

CHARLES HEDGES, OF BOX, ENGLAND.

STAKE-SHOE.

SPECIFICATION forming part of Letters Patent No. 492,520, dated February 28, 1893.

Application filed September 19, 1892. Serial No. 446,262. (No model.)

*To all whom it may concern:*

Be it known that I, CHARLES HEDGES, a subject of the Queen of England, residing at Spa House, Box, Wiltshire, England, have invented an Improved Stake-Holder, of which the following is a specification.

The invention consists in a device to be fixed to the base of a hurdle stake, pole, or the like to support the latter when said device is driven into the ground and the general objects of the invention are to hold such stake pole or the like more securely than if it were merely driven into the ground, to enable it to be driven into very hard as well as soft ground, and adjustable to give a good support to the stake whatever the nature of the ground in this respect.

In the accompanying drawings Figure 1 is a perspective view of the stake holder supporting a stake in medium hard ground. Fig. 2 is a detail view of the head of the stake holder. Fig. 3 is a detail view showing the connecting of the adjustable arms to the stem.

The stake holder consists essentially of a straight spike $a$ of metal such as iron or steel having on its upper end a clamp for receiving the foot of the stake which is secured therein by a ring or collar $b$. The clamp consists of a fixed member $c$ and a hinged member $c'$, the upper ends of these being made to partially encircle the stake. The collar $b$ is preferably slightly conical.

In combination with the spike $a$ there are employed two (or more if desired) arms $d$ which are so attached to the spike that they project at right angles thereto and at a suitable angle to each other in the same horizontal plane. The essential feature of these arms which form supports lying in the surface of the ground is that they may be adjustable, that is to say fixed at a desired height in the spike so that the latter may be embedded to a depth suited to the nature of the ground. For rocky or very hard ground the arms are fitted nearer to the point of the spike so that the latter need not be driven far before the arms rest upon the surrounding ground; while for soft ground the arms are fitted near to the clamp on the spike and thus give a greater effective length of spike.

Various means may be employed for fixing the arms to the spike but a simple light and inexpensive way is to provide the arms with turned down plates $d'$ with holes $d^2$ and making along the spike a number of holes $a'$ equidistant with each other and with those on the plates $d'$. Bolts $e$ with nuts may be passed through the plates $d'$ and spike $a$ at the desired place to bolt the arms firmly to the spike.

The arms $d$ are provided with turned down points $d^3$ at their outer ends.

Having described my invention, I claim—

1. A stake holder comprising in combination a spike $a$, a clamp on the head thereof said clamp consisting of a fixed member $c$ and a hinged member $c'$; a ring $b$, and two or more arms projecting from said spike and adapted to be fixed radially thereto nearer or farther from the point thereof for the purpose set forth.

2. A stake holder comprising in combination a straight spike $a$ having a series of holes $a'$ therein, and two or more arms $d$ having plates $d'$ with holes $d^2$ corresponding in distance to the holes $a'$, together with bolts $e$ and nuts whereby the arms may be fixed nearer to or farther from the point of the spike for the purpose set forth.

In witness whereof I have signed this specification in presence of two witnesses.

CHARLES HEDGES.

Witnesses:
 WM. J. MATTHEWS,
  *Wantage Berks, Solicitor's Clerk.*
 EDWD. B. ORMOND,
  *Solicitor, Wantage Berks.*